United States Patent [19]

Arai

[11] Patent Number: 5,862,111
[45] Date of Patent: Jan. 19, 1999

[54] OPTICAL DISK DEVICE WHICH PERFORMS AUTO GAIN CONTROL PROCESS ON SERVO SIGNALS WHICH PERFORM ILLUMINATING CONTROL OF A LIGHT BEAM ON THE DISK'S RECORDING SURFACE

[75] Inventor: Hiroshi Arai, Yokohama, Japan

[73] Assignee: Nikon Corporation, Tokyo, Japan

[21] Appl. No.: 707,533

[22] Filed: Sep. 4, 1996

[30] Foreign Application Priority Data

Sep. 4, 1995 [JP] Japan ................................ 7-226467

[51] Int. Cl.⁶ ........................................................ G11B 7/00
[52] U.S. Cl. ........................................ 369/44.36; 369/116
[58] Field of Search ................................... 369/112, 116, 369/47, 48, 50, 53, 54, 44.29, 44.31, 44.35, 44.36

[56] References Cited

U.S. PATENT DOCUMENTS 4,408,314  10/1983  Yokota .............................. 369/44.31 X
4,774,698   9/1988  Henmi et al. ..................... 369/44.36 X
5,105,409   4/1992  Kaku et al. .......................... 369/44.31
5,113,384   5/1992  McDonald et al. .............. 369/44.35 X Primary Examiner—Paul W. Huber

[57] ABSTRACT

An optical disk device that reads and/or writes information to or from an optical disk. The optical disk device includes a recording signal output unit to output a signal to be recorded on an optical disk, an illuminating device to illuminate a recording surface of the optical disk with a light beam, a light generation control unit to control the intensity of the light beam according to the signal to be recorded, a calculating unit to calculate a value according to the level of the signal to be recorded, a light detector to receive the reflected light from the optical disk and to convert the reflected light to an electrical signal, and a gain adjustment unit to adjust the level of the output signal from the optical detector, based on the gain according to the output value from the calculating unit, and a control unit to control the illuminating device according to the output signal from the gain adjustment unit.

14 Claims, 2 Drawing Sheets

OPTICAL DISK DEVICE WHICH PERFORMS AUTO GAIN CONTROL PROCESS ON SERVO SIGNALS WHICH PERFORM ILLUMINATING CONTROL OF A LIGHT BEAM ON THE DISK'S RECORDING SURFACE

CROSS REFERENCE TO RELATED APPLICATIONS

This application is based upon and claims priority from Japanese Patent Application No. 07-226467 filed Sep. 4, 1995, the contents of which are incorporated herein by reference.

BACKGROUND OF THE INVENTION

1. Field of the Invention

The present invention relates to an optical recording and replay device which performs recording and replay of data by illuminating an optical disk recording substrate with a light beam. In particular, the present invention relates to an optical disk device which performs an auto gain control (AGC) process on servo signals which perform illuminating control of the spot of the light beam on the recording surface of the optical disk.

2. Description of the Related Art

An example of a known device of this type of optical disk device is shown in FIG. 2. In FIG. 2, a spindle motor 2 rotates an optical disk 1. An objective lens 3 causes focusing of a light beam (laser light) which is generated by a laser 10. The optical disk 1 is illuminated by this laser beam. An optical detector 4 detects the amount of reflected light of the light beam illuminating the optical disk 1.

The objective lens 3 is movable in a direction to follow the tracks (namely, a parallel direction with respect to the recording surface of the optical disk), or a direction transverse to the tracks of the optical disk 1, by an actuator 5. Moreover, the objective lens 3 is movable in a direction perpendicular to the recording surface of the optical disk 1 by an actuator 6.

A recording signal processing unit 7 processes the data which is to be recorded on the optical disk 1. The laser 10 is controlled by a laser control unit 8 and a laser drive unit 9. Moreover, an analog divider 11 performs analog division based on the difference signal (the tracking error signal TE, mentioned later) and the sum signal (entire amount of reflected light) of the reflected light detected by the optical detector 4. The analog divider 14 performs analog division based on the difference signal (the tracking error signal TE, mentioned later) and the sum signal of the reflected light detected by the optical detector 4.

In this manner, a prior art optical disk device, with analog dividers 11, 14, provides a focus error signal FE and a track error signal TE as respective wave inputs, and in addition provides a total amount of light (sum signal) as a divider input.

Then, by the gain of a first servo loop consisting of the analog divider 11, servo processing unit 12, amplifier 13 and actuator 5, tracking control of the light beam with respect to the track of the optical disk 1 is performed on the one hand, and by the gain of a second servo loop consisting of the analog divider 14, servo processing unit 15, amplifier 16 and actuator 6, focus control is performed which controls the focal position of the light beam with respect to the recording surface of the optical disk 1.

In this manner, in a prior art optical disk device, the gain of the autofocus servo or tracking servo or the like servo loops are set by an analog divider, independently of the amount of reflected light. However, in optical disks, because the reflectivity of the recording surface from each manufacturer is generally different, when the focus control or tracking control of each optical disk is performed by the servo loops of the prior art devices, scattering of the loop gain occurs due to scattering of the amount of reflected light. Thus, the problem existed that oscillation sometimes occurred in the servo loops.

Moreover, in such a prior art device, the responsiveness to changes in the amount of light was poor, and at the moment of beginning or ending data recording, gain errors arose due to not being able to follow the changes of the amount of light. A problem also existed that the servos did not operate stably. Furthermore, because an analog divider was used, there was a problem that offset voltages tended to arise due to the effects of temperature or power supply changes.

SUMMARY OF THE INVENTION

Accordingly, it is an object of the present invention to overcome the above deficiencies of the prior art and to obtain an optical disk device in which stabilized servo operation is achieved.

Objects of the present invention are achieved by an optical disk device including a recording signal output unit to output a signal to be recorded on an optical disk, an illuminating device to illuminate the recording surface of the optical disk with a light beam, a light generation control unit to control intensity of the light beam according to the signal to be recorded, a calculating unit to calculate a value according to a level of the signal to be recorded, a light detector to receive the reflected light from the optical disk and to convert the reflected light into an electrical signal, a gain adjustment unit to adjust the level of the output signal from the optical detector based on the gain according to the value which was calculated by the calculating unit, and a control unit to control the illuminating device according to the output signal from the gain adjustment unit.

Moreover, further objects of the present invention are achieved by an optical disk device wherein the output value of the calculating unit is the average value of the level of the signal to be recorded.

Moreover, still further objects of the present of the present invention are achieved by an optical disk device wherein the output value of the calculating unit is calculated based on the duration of high emission periods and low emission periods of the light beam and the intensity during the high emission periods and low emission periods of the light beam.

Yet further objects are achieved by an optical disk device having a focus actuator which causes the illuminating device to move in a perpendicular direction with respect to the recording surface of the optical disk, with the control unit performing focusing control by driving the focus actuator.

Further objects of the present invention are achieved by an optical disk device having the control unit, which has a tracking actuator that causes the light beam of the illuminating device to follow the recording surface of the optical disk, perform tracking control by driving the tracking actuator.

Moreover, objects of the present invention are also achieved by an optial disk device wherein the gain adjustment unit, having an A/D converter which converts the output signal from the optical detector and the output signal from the calculating unit into digital signals, performs digital calculations by the digital signals which are output from the A/D converter.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiment, taken in conjunction with the accompanying drawings in which.

DETAILED DESCRIPTION OF THE PREFERRED EMBODIMENTS

Figure 1:
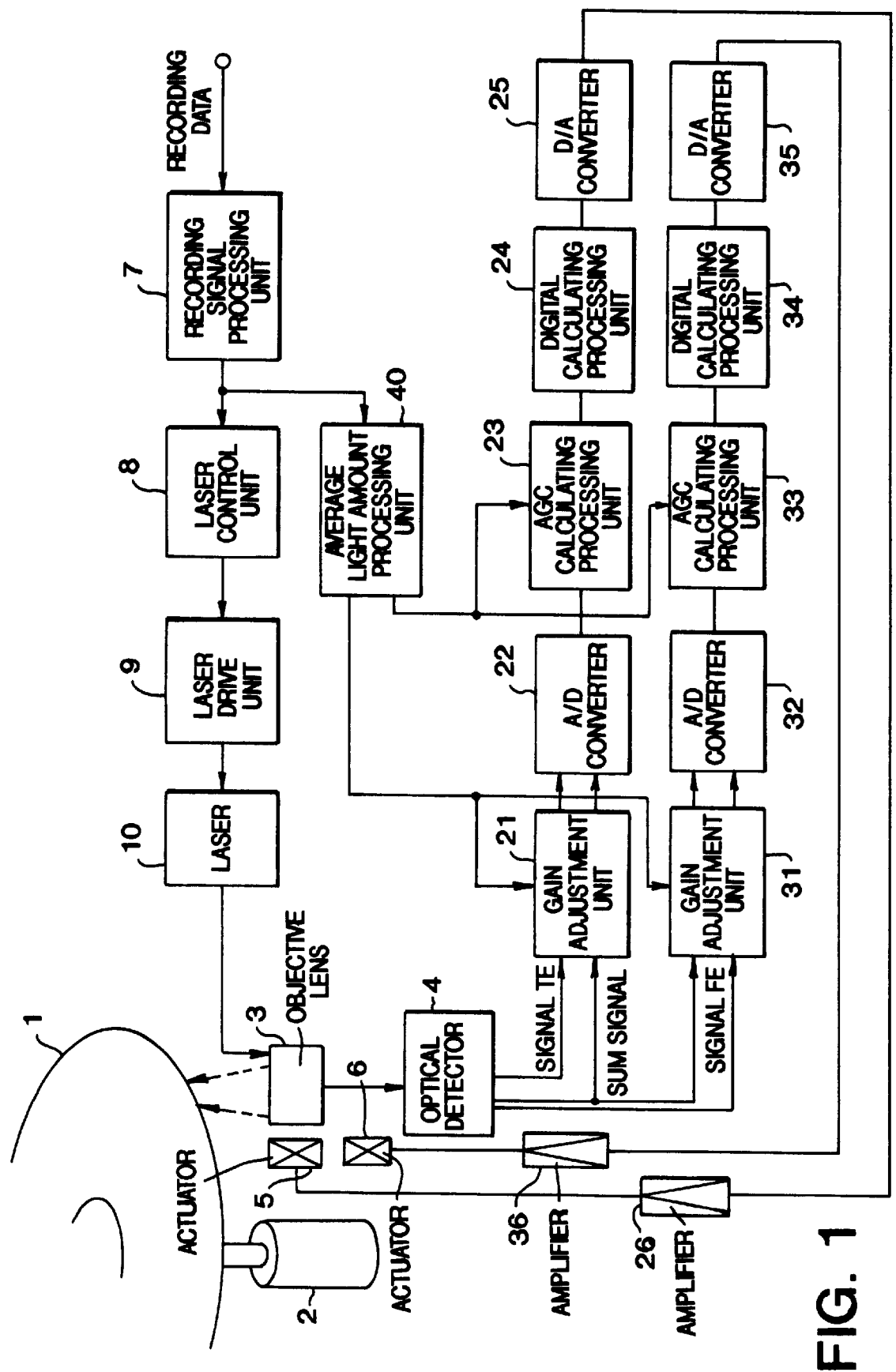
FIG. 1 is a block diagram showing the constitution of an optical disk device according to a preferred embodiment of the present invention.
Figure 2:
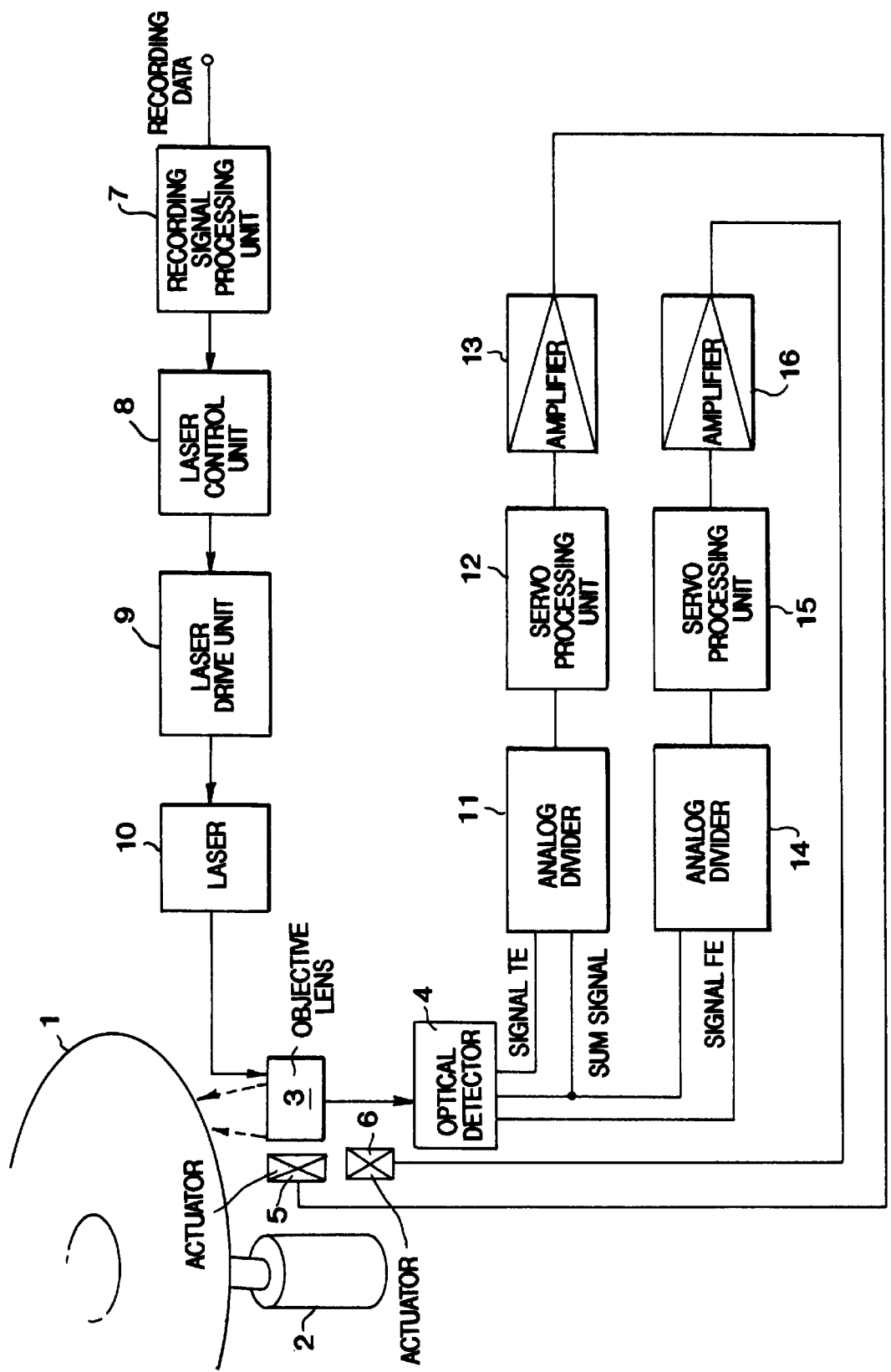
FIG. 2 is a block diagram showing the constitution of a prior art device.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a diagram showing the constitution of an optical disk device according to a preferred embodiment of the present invention. In this Figure, a stepping motor 2 causes an optical disk 1 to rotate. An objective lens 3 causes focusing of a light beam (laser light) which is generated by a laser 10, by which the optical disk is illuminated. An optical detector 4 receives, via the objective lens 3, the reflected light of the light beam with which the optical disk 1 is illuminated, and detects the amount of reflected light.

Moreover, a recording signal processing unit 7 processes the data which is to be recorded on the optical disk 1. The laser 10 is controlled by a laser control unit 8 and a laser drive unit 9. Moreover, a gain adjustment unit 21 performs analog division based on the difference signal (the tracking error signal TE, mentioned later) and the sum signal (entire amount of the reflected light) of the reflected light detected by an optical detector 4. A gain adjustment unit 31 performs analog division based on the difference signal (the focus error signal FE, mentioned later) and the sum signal of the reflected light detected by the optical detector 4.

The objective lens 3 is movable in a direction to follow the tracks (namely, a parallel direction with respect to the recording surface of the optical disk), or a direction transverse to the tracks of the optical disk 1, by an actuator 5 (tracking actuator). Moreover, it is movable in a direction perpendicular to the recording surface of the optical disk 1 by an actuator 6 (focus actuator).

Then, recording data is sent from a host computer (not shown in the drawing) and the like with respect to an optical disk device constituted in this manner, and when this recording data is input to the recording signal processing unit 7, the recording signal processing unit 7 converts this recording data into a recording signal. The converted recording signal is then output to a laser control unit 8 and to an average light amount processing unit 40.

The laser control unit 8 gives rise to a laser drive signal corresponding to the level of the recording signal, and outputs it to a laser drive unit 9. A drive current is generated by the laser drive unit 9 which drives the laser 10 such that the intensity of the light beam emitted from the laser 10 corresponds to the drive signal.

The outgoing light beam from the laser 10 enters the objective lens 3 and is converged on the recording surface of the optical disk 1. Then the reflected light from the incident light beam with which the optical disk 1 is illuminated is received, via the objective lens 3, by an optical detector 4. The optical detector 4 is constituted, for example, by a four-part split photodetector When the reflected light of the light beam is received, by adding and subtracting the respective outputs of the photodetectors, a tracking error signal TE, a focusing error signal FE, and a total light amount signal (the sum signal from four photodetectors) are respectively output.

The recording signal from the recording signal processing unit 7 is also output to an average light amount processing unit 40. In this case, in the average light amount processing unit 40, the duration of the period when the recording signal is at a high level (namely, when the laser 10 is caused to emit light strongly), and the duration of the time when the recording signal is at a low level (namely, when the laser 10 is caused to emit light weakly) are found. Furthermore, the level value when the recording signal is at a high level (the emission intensity when the laser 10 is caused to emit light strongly), and the level value when the recording signal is at a low level (the emission intensity when the laser 10 is caused to emit light weakly) are found. Then the average light amount of the laser light is calculated from the values found, and is output to each gain adjustment unit 21, 31 and each AGC calculating processing unit 23, 33.

Here, the average light amount signal from the average light amount processing unit 40, the focus error signal FE, and the total light amount signal from the optical detector 4, are output to the gain adjustment unit 31. In the gain adjustment unit 31, with an input corresponding to the average light amount signal from the average light amount processing unit 40, by adjusting the dynamic range of the input focus error signal FE and the total light amount signal, each adjusted signal may be output to an A/D converter 32.

In the A/D converter 32, the respective input signals are converted into digital values, which are output to the AGC calculating processing unit 33. The average light amount signal from the average light amount processing unit 40 is output to the AGC calculating processing unit 33. The AGC calculating processing unit 33, based on the average light amount signal from the average light amount processing unit 40 and on the digital values (namely, the focus error amount and total light amount) from the A/D converter 32, finds the gain by performing digital calculation processes, and outputs the gain to a digital calculating processing unit 34.

In the digital calculating processing unit 34, digital calculating processing is performed, based on the gain which was found by the AGC calculating processing unit 33. Furthermore, the action amount of the focus actuator 6 is found.

Because the action amount of the focus actuator found in this manner by the digital calculating processing unit 34 is a digital value, it is converted by a D/A converter 35 into an analog signal, which is output to an amplifier 36. The amplifier 36 amplifies the signal from the D/A converter 351 and drives the focus actuator 6.

In this manner, by the servo loop including the gain adjustment unit 31, A/D converter 32, AGC calculating processing unit 33, digital calculating processing unit, D/A converter 35 and amplifier 36, focus control of the light beam is performed with respect to the recording surface of the optical disk 1. Moreover, tracking control instead of focus control is performed in a similar manner to the action in the case of focus control, by the servo loop including the gain adjustment unit 21, A/D converter 22, AGC calculating processing unit 23, digital calculating processing unit 24, D/A converter 25, and amplifier 26, and accordingly its description is omitted.

Proceeding in this manner, it becomes possible to set the gain of the servo loops performing drive control of the objective lens 3 (the focusing servo loop and the tracking servo loop), and accordingly a stabilized servo operation can be expected.

Moreover, in the present embodiment, in each digital calculating processing unit 24, 34, digital calculations are performed based on the gain found by respective AGC calculating processing units 23, 33, and the action amounts of the tracking actuator 5 and of the focusing actuator 6 are found. However, the optical disk device may be constituted by disposing analog calculating processing units instead of digital calculating processing units, and performing analog calculations in these analog calculating processing units, with each calculated action amount then being directly output to the tracking actuator 5 and the focusing actuator 6.

The optical disk device according to the present embodiment as described above, for each servo loop, because AGC is effected, sets as a standard signal the value based on the signal level when recording is performed from the signal, and the gain of the autofocus servo and of the tracking servo can be set over the whole region of recording data. Accordingly, stabilized servo action can be expected, and accurate autofocus control and tracking control can be performed.

Moreover, because the calculation was performed such as to set the output value of the average light amount processing unit as the average value of the signal to be recorded, the gain value which is sent to the gain adjustment unit by the average light amount processing unit can be simply found.

Furthermore, because the calculation was performed such as to be based on the duration of the periods when the light beam was strongly emitted and weakly emitted, and on the intensity of the light beam when strongly emitted and weakly emitted, the gain value which is sent to the gain adjustment unit by the average light amount processing unit can be accurately found.

Moreover, because the output signal level from the optical detector is adjusted based on the gain corresponding to the value calculated in the average light amount processing unit, because the focusing actuator is driven in such a manner as to cause the illuminating means to move in a direction perpendicular to the recording surface of the optical disk corresponding to the adjusted output signal, it is possible to perform accurate focus control.

Moreover, because the tracking actuator which causes the light beam to follow the recording surface of the optical disk is driven such as to correspond to the adjusted output signal from the optical detector, it is possible to perform accurate tracking control.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An optical disk device, comprising:
    a recording signal output unit to output a signal to be recorded on an optical disk;
    an illuminating device to illuminate a recording surface of the optical disk with a light beam;
    a light generation control unit to control the intensity of the light beam according to the signal to be recorded;
    a calculating unit to calculate and output a value according to the level of the signal to be recorded;
    a light detector to receive the reflected light from the optical disk and to convert the reflected light to an electrical signal;
    a gain adjustment unit to adjust the level of the output signal from the light detector, based on the gain according to the output value from the calculating unit;
    an auto gain control unit to find a gain based on the level found by the calculating unit and based on an output from said gain adjustment unit; and
    a control unit to control the illuminating device according to the output signal from the auto gain control unit.

2. An optical disk device according to claim 1, wherein the output value of the calculating unit is an average value of a level of the signal to be recorded.

3. An optical disk device according to claim 1, wherein the output value of the calculating unit is calculated based on the duration of high emission periods and low emission periods of the light beam and intensity of the high emission periods and low emission periods of the light beam.

4. An optical disk device according to claim 1, wherein the control unit includes a focus actuator to cause the illuminating device to move in a perpendicular direction with respect to the recording surface of the optical disk, and to perform focusing control by driving the focus actuator.

5. An optical disk device according to claim 1, wherein the control unit includes a tracking actuator to cause the light beam of the illuminating device to follow the recording surface of the optical disk, and performs tracking control by driving the tracking actuator.

6. An optical disk device comprising:
    a recording signal output unit to output a signal to be recorded on an optical disk;
    an illuminating device to illuminate a recording surface of the optical disk with a light beam;
    a light generation control unit to control the intensity of the light beam according to the signal to be recorded;
    a calculating unit to calculate and output a value according to the level of the signal to be recorded;
    a light detector to receive the reflected light from the optical disk and to convert the reflected light to an electrical signal;
    a gain adjustment unit to adjust the level of the output signal from the light detector, based on the gain according to the output value from the calculating unit; and
    a control unit to control the illuminating device according to the output signal from the gain adjustment unit,
    wherein the gain adjustment unit includes an A/D converter to convert the output signal from the light detector and the output signal from the gain adjustment unit into digital signals, and performs digital calculations using the digital signals which are output from the A/D converter.

7. An optical disk device, comprising:
    an illuminating device to illuminate a recording surface of an optical disk with a light beam;
    a light generation control unit to control intensity of the light beam according to a signal to be recorded;
    a calculating unit to calculate a value according to a level of the signal to be recorded;
    a gain adjustment unit to adjust the level of the light beam output by the illuminating device, based on the gain according to the output value from the calculating unit;

an auto gain control unit to find a gain based on a level found by the calculating unit and based on an output from said gain adjustment unit; and a control unit to control the illuminating device according to the output signal from the gain adjustment unit.

8. An optical disk device according to claim 7, wherein the output value of the calculating unit is calculated based on the duration of high emission periods and low emission periods of the light beam and intensity of the high emission periods and low emission periods of the light beam.

9. An optical disk device comprising:

an input unit to illuminate a recording surface of the optical disk with a light beam carrying an input signal;

a calculating unit to calculate and output a value according to the level of the signal to be recorded;

a light detector to receive the reflected light from the optical disk and to convert the reflected light to an electrical signal;

a gain adjustment unit to adjust the level of the output signal from the light detector, based on the gain according to the output value from the calculating unit;

an auto gain control unit to find a gain based on the value found by the calculating circuit and based on an output signal from said gain adjustment unit; and a control unit to control the illuminating device according to the output signal from the gain adjustment unit and the gain from the auto gain control unit.

10. An optical disk device as claimed in claim 9, further comprising a second gain adjustment unit that receives the output value from the calculating unit and the signal from said light detector.

11. An optical disk device as claimed in claim 10, further comprising a second auto gain control unit that receives the value from said calculating unit and receives an output from said second gain adjustment unit.

12. An optical disk device as claimed in claim 10, further comprising a second control unit to control the illuminating device according to the output signal from the second gain adjustment unit.

13. An optical disk device as claimed in claim 10, wherein the second gain adjustment unit includes an A/D converter to convert the output signal from the light detector into a digital signal, and performs digital calculations using the digital signal which is output from the A/D converter.

14. A method for controlling an optical disk device comprising:

illuminating a recording surface of the optical disk with a light beam;

controlling the intensity of the light beam according to a signal to be recorded;

calculating and outputting a value according to a level of the signal to be recorded;

detecting a reflected light from the optical disk and converting the reflected light to an output signal;

adjusting the level of the output signal, based on a gain according to the output value from said calculating;

finding a second gain based on a level found from said calculating and based on an output from said adjusting; and controlling the illuminating device according to an output signal from said finding.

* * * * *